UNITED STATES PATENT OFFICE.

THOMAS SYMINGTON AND CHARLES SYMINGTON, OF HARFORD COUNTY, MARYLAND.

IMPROVEMENT IN IMITATION MARBLE.

Specification forming part of Letters Patent No. 152,577, dated June 30, 1874; application filed February 7, 1874.

*To all whom it may concern:*

Be it known that we, THOMAS SYMINGTON and CHARLES SYMINGTON, of the county of Harford, State of Maryland, have invented a certain process for producing a more lasting imitation of the various marbles than that now in use, of which the following is a specification:

The object of our invention is to produce an imitation of the various marbles or devices on porcelain by coating or enameling soapstone with vitrifiable pigments of various colors not affected by heat, or marbleizing it with colors not affected by heat, or glazing it in its natural state with a transparent vitrifiable glaze.

The soapstone is first prepared in any desirable shape. It is then enameled or marbled, as the case may be, with heat-enduring colors, and inclosed in a comparatively airtight chest made of soapstone slabs or fireclay, and subjected to a moderate white heat. When cooled off it may, if necessary, be covered with a transparent glaze, and again be subjected to heat to vitrify the glaze. If the soapstone is wanted to appear in its natural state, a transparent glaze may be put upon it and subjected to heat, as above. When being cooled off the surface, when necessary, may be reduced by polishing.

We claim—

Marbleizing articles formed of soapstone as a base with vitrifiable pigments or colors not affected by heat.

THOS. SYMINGTON.
CHARLES SYMINGTON.

Witnesses to signature of THOMAS SYMINGTON:
JOHN TRAGO,
F. B. HANSON.

Witnesses to signature of CHARLES SYMINGTON:
WILLIAM F. ROBB,
JOHN C. HUTCHINS.